Oct. 6, 1970 R. J. ANDERSON 3,532,898

QUADRATURE REJECTION NETWORK

Filed Sept. 28, 1967 2 Sheets-Sheet 1

INVENTOR.
RICHARD J. ANDERSON
BY Herbert L. Davis
ATTORNEY

Oct. 6, 1970 R. J. ANDERSON 3,532,898

QUADRATURE REJECTION NETWORK

Filed Sept. 28, 1967 2 Sheets-Sheet 2

INVENTOR.
RICHARD J. ANDERSON

BY Herbert L. Davis

ATTORNEY

1

3,532,898
QUADRATURE REJECTION NETWORK
Richard John Anderson, Fairfield, N.J., assignor to The Bendix Corporation, a corporation of Delaware
Filed Sept. 28, 1967, Ser. No. 671,319
Int. Cl. H03k 5/20
U.S. Cl. 307—232 4 Claims

ABSTRACT OF THE DISCLOSURE

An electrical network for providing an output signal proportional to the integral of inphase components of an input signal of a frequency corresponding to a reference signal frequency and to reject quadrature components of the input signal; that is, signals which are ninety degrees out of phase with the desired signal, such as undesired signals which may cause a servo error null monitor to produce a false warning indication, saturate a servo amplifier, or reduce the gain of the servo loop and cause a servomotor to overheat. In order to effect the foregoing rejection of the quadrature components of the input signals, there is provided in the present invention a pair of current flow control devices operable as switches in accordance with the magnitude and polarity of the reference signal to control the charge and discharge paths of a capacitor of an integrator network so that the capacitor is only charged during alternate half cycles of the reference signal by the inphase component of the signal and discharged through a load during the other alternate half cycles of the reference signal to thereby provide across the load an output signal proportional to the integral of the inphase component of the input signal. The load may be arranged to operate suitable means to give a fault indication representative of an excessive inphase component of the input error signal and which indication is unaffected by the rejected quadrature component.

BACKGROUND OF THE INVENTION

Field of the invention

This invention relates to a network for eliminating the quadrature component of a constant frequency input signal and for passing the inphase component thereof with respect to a reference signal and to provide an output signal of magnitude proportional to the integral of the inphase signal component.

Description of the prior art

The prior art manifests a recognition of the desirability of the elimination of the quadrature components of an input signal, particularly as applied in alternating current servo systems and servo null error monitors so as to significantly improve the performance of the systems. Heretofore, the quadrature rejection apparatus has required complex circuitry which has been of large size such as the apparatus utilizing the technique of phase sensitive isolation, modulation and demodulation. Such apparatus requires calibration adjustments to null both the modulator and demodulator. Separate isolated reference voltages are usually required for the modulator and demodulator. Further, such devices often required the utilization of matched circuit components in order to use the apparatus under varying temperature conditions. Further, prior art devices have required the use of diodes to provide a rectification function in conjunction with the reference signal applied to the quadrature rejection circuit.

In this connection, there are a number of U.S. Patents assigned to The Bendix Corporation, the assignee of the present invention, which relate to prior art quadrature rejection devices including solid state switching circuitry including U.S. Pat. Nos. 3,030,522 granted Apr. 17, 1962 to Benjamin Fennick; 3,165,704 granted Jan. 12, 1965 to George A. Shacknow; 3,223,848 granted Dec. 14, 1965 to Robert J. Molnar and Walter Parfomak; 3,244,987 granted Apr. 5, 1966 to Frank Prapis and Gunter J. Gessner; and 3,322,967 granted May 30, 1967 to Gunter J. Gessner.

While in the Molnar et al. U.S. Pat. No. 3,223,848 a reference voltage input is used to switch a diode bridge to provide gating for the input signal for which quadrature rejection is desired and the Gessner U.S. Pat. No. 3,322,967 utilizes bilateral transistors as switching elements, it should be borne in mind that all of these prior art references include diodes to provide a rectification function as heretofore noted, whereas in the present invention, quadrature rejection is effected without diodes in a circuit less complex in structure than the aforenoted patents.

Furthermore, U.S. Pat. No. 2,996,677 granted Aug. 15, 1961 to Stephen P. Marcy discloses a quadrature rejection network utilizing analog operational amplifiers including a phase inverting reference and input signal amplifier with a first pair of diodes disposed within the amplifier feedback loop, a second reference signal phase inverting amplifier and a third input signal amplifier serially connected to the second amplifier and including a second pair of diodes connected within a feedback loop of the third amplifier and oppositely poled from the diodes in the feedback loop of the first amplifier. Operatively arranged with the foregoing there is further provided a fourth output amplifier including a pair of cascaded T network filters within the feedback loop of the fourth amplifier, as discussed in column 4, lines 3 through 42, of the Marcy patent, for substantially eliminating the quadrature from the inphase component.

SUMMARY OF THE INVENTION

The vastly more complex network of the quadrature signal rejectors of the prior art, as exemplified by the Marcy U.S. Pat. No. 2,996,677, with its multiplicity of amplifiers, diodes in the feedback networks of the input amplifiers and the cascaded T network filters within the feedback loop of the output amplifier, provides no suggestion of the present invention which rests on a conception which simplifies complex circuitry and reduces the number of parts, at the same time raising the percent of durability and certainty of operation, and not only with greater certainty, but with less expense.

The present invention provides a quadrature rejection network which is simple in structure compared with the prior art devices and which employs no diodes thereby reducing the cost. A two transistor switching circuit controlled by the polarity of a reference signal source, is provided with a suitable resistance-capacitance integrator network whereby the capacitor is charged by the inphase component of the input signal and the charge and discharge paths are controlled by the mutual switching of the two transistors.

An error input signal from a system signal generating device, which error input signal commands a servomotor and is of a constant frequency with respect to a reference signal but out of phase relation with the reference signal may be defined in terms of an input component relative to the reference signal and a quadrature component, a component 90° out of phase with the reference signal. Since quadrature components present particular problems in servo systems and servo error null monitors with which the invention may be used, although not limited thereto, the invention accordingly provides a novel quadrature rejection network in which an input signal out of phase with a reference voltage causes an output signal proportional to the integral of the inphase component of the input signal while rejecting the quadrature component.

An object of this invention is to provide a novel quadrature rejection network having a minimum number of parts operable over wide temperature variations.

Another object of this invention is to provide a quadrature rejection network in which the use of modulators and demodulators is not required.

A further object of this invention is to provide a quadrature rejection network in which inphase components of an input signal with respect to a reference signal, cause an output signal proportional to the integral of the inphase component of the input signal.

A further object of this invention is to provide a quadrature rejection network in which matched components are not required.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

Referring to FIG. 1, the quadrature rejection network 10 is shown connected to output line 2 of an alternating current signal generating device 5 of a type effecting an error signal as a result of signal comparisons therein or which signal generating device 5 may be a synchro of conventional type having an input energizing line 1 and a grounded input-output conductor 3; and an alternating current servo error monitor 6 of a servo system is provided for monitoring the signal from the signal generating device 5, a component of which signal controls the direction and speed of a servomotor 12. The output of the signal device 5 applied at line 2 is connected through an amplifier 7 having a grounded input-output conductor 8 and an output conductor 9 to a control winding 11 of a two phase reversible variable speed alternating current servomotor 12 of conventional type. The servomotor 12 has a grounded input conductor 14 and a fixed phase winding 13 connected through a conductor 16 across a suitable source of alternating current 18 having a grounded output conductor 19.

Figure 1:
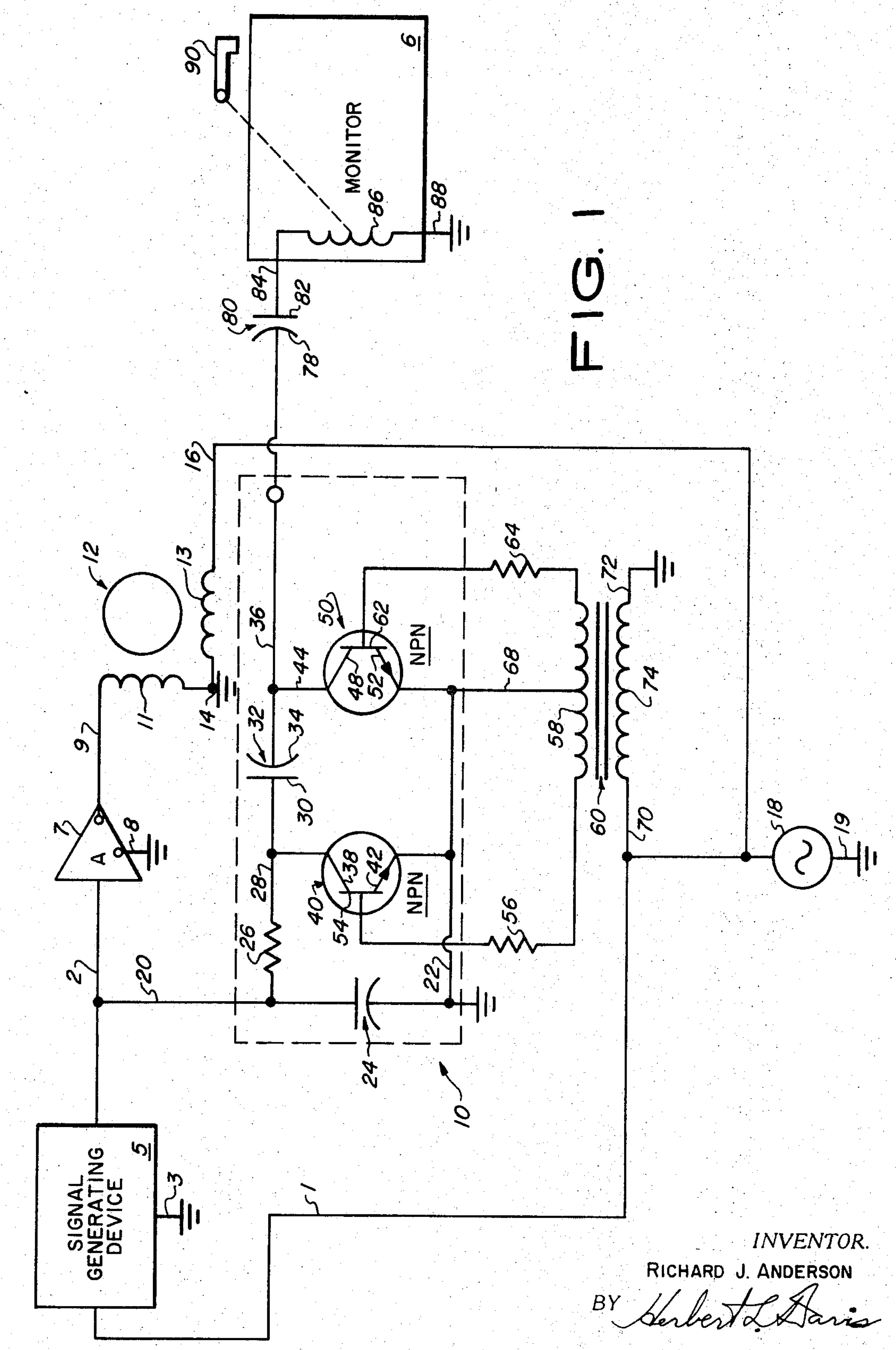
FIG. 1 is a schematic diagram of the quadrature rejection network of the invention.

The signal generating device 5 may be of a conventional type such as heretofore described or a synchro providing an A.C. output signal on a stator winding thereof which signal corresponds to the position of a rotor inductively coupled thereto and connected by the line 1 and grounded conductor 3 across the source of alternating current 18. The output of the signal generating device 5 is further connected between line 20 and grounded input-output conductor 22 of the quadrature rejection network 10.

Thus, an alternating current signal comprising the inphase component and the undesired quadrature component is applied through the amplifier 7 to the servomotor 12 and is also applied between the lines 20 and grounded input-output conductor 22 and across a filter capacitor 24. A resistor 26 is connected at one end to the line 20 and through the line 20 to one plate of the capacitor 24 having an opposite plate connected to the grounded conductor 22. The other end of the resistor 26 is connected through a line 28 to one plate 30 of a capacitor 32 having an opposite plate 34 connected to a conductor 36. The resistor

26 and capacitor 32 function as an integrator as will be more fully hereinafter described.

A collector element 38 of a current flow control device such as an NPN type transistor 40 is connected to the line 28 while an emitter element 42 of transistor 40 is connected to the grounded conductor 22. The capacitor 32 has the opposite plate 34 connected by the conductor 44 to a collector element 48 of a second current flow control device such as an NPN type transistor 50 having an emitter element 52 also connected to the grounded conductor 22.

A base element 54 of the transistor 40 is connected through a resistor 56 to one end of a secondary winding 58 of a differential power transformer 60 while a base element 62 of the transistor 50 is connected through a resistor 64 to an opposite end of the secondary winding 58 of the differential power transformer 60. The secondary winding 58 of the differential transformer 32 is center tapped and connected by a conductor 68 to the grounded conductor 22. A reference signal of known frequency is applied by the A.C. source 18 across lines 70 and 72 to a primary winding 74 inductively coupled to the secondary winding 58 of the differential power transformer 62 and which winding 58 is so arranged that the alternating current induced thereon is applied through resistor 64 one hundred and eighty degrees out of phase with the alternating current applied through resistor 56.

The line 36 leading from plate 34 of the capacitor 32 to the collector 48 of transistor 50 is also connected to a plate 78 of a coupling capacitor 80 which has an opposite plate 82 connected by a conductor 84 in series with an input impedance winding 86 of the servo error signal monitor 6 having an opposite end of the input impedance 86 connected to a grounded conductor 88. The monitor 6 may be of a conventional type such as a voltmeter or control relay operated by the impedance winding 86 to give a fault indication upon the voltage applied across the impedance winding 86 extending a predetermined critical value or the impedance 86 may act as a motor winding for positioning a flap 90 to provide such a fault indication.

OPERATION

Referring to FIG. 1, the reference signal from the source of alternating current 18 regulates the switching of the transistors 40 and 50 to the on (conducting state) and to the off (non-conducting state), that is, on the positive half cycles of the reference source signal the transformer 60 induces into the secondary winding 58 a current in one sense which effects through the resistor 56 to the base element 54 of transistor 40 a positive signal thereby rendering transistor 40 conductive, and through the resistor 64 to base element 62 of transistor 50 a negative signal which renders transistor 50 non-conductive.

Similarly, during the opposite negative half cycles of the alternating current reference source 18, the transformer 60 induces into the secondary winding 58 a current of opposite sense so that there is applied through resistor 64 to the base element 62 of the transistor 50 a positive signal pulse which renders the transistor 50 now conductive while there is applied through resistor 56 to the base element 54 of the transistor 40 a negative pulse which renders the transistor 40 thereupon non-conductive. The transistors 40 and 50 act in the on-off states as switches so that the transistor 40 serves to short circuit the line 28 to line 22 when the transistor 40 is conductive and similarly the transistor 50 serves to short circuit the line 36 to line 22 when transistor 50 is rendered conductive.

In resolving an input signal into an inphase signal component and a quadrature signal component with respect to the reference signal, it should be noted that the reference signal supplied by the source of alternating current 18 controls the switching of the transistors 40 and 50. It should be further borne in mind that in vector form the reference signal may be indicated by a vector of a length corresponding to the peak amplitude of the reference signal and drawn along a horizontal axis of a vector diagram (not shown).

An input signal of the same frequency as the reference signal may also be indicated by a vector of length corresponding to the peak amplitude of such input signal and drawn from the intersection of the horizontal and vertical axes and at some angle $\theta$ from the reference signal vector whereby $\theta$ is the phase angle that the input signal leads or lags the reference signal. The inphase signal component of the input signal with respect to the reference signal is therefore the amplitude of the input signal multiplied by the cosine of the phase angle $\theta$; that is, the inphase component is the projection on the horizontal axis of the input signal vector. The quadrature component of the input signal is, of course, the amplitude of the input signal vector multiplied by the sine of the phase angle $\theta$; that is, the quadrature component is the projection of the input signal vector on the vertical axis.

Figure 2:
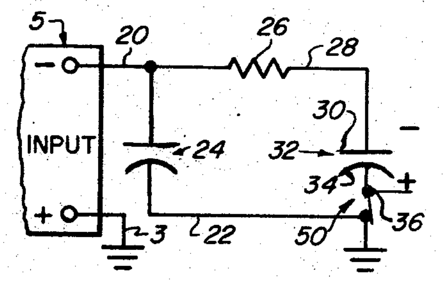
FIG. 2 is a schematic diagram of the effective circuit of the quadrature rejection network of FIG. 1 during the reference excitation negative half cycles.
Figure 3:
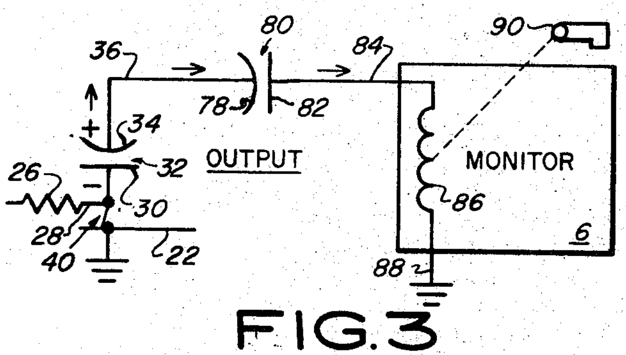
FIG. 3 is a schematic diagram of the other effective circuitry of the quadrature rejection network of FIG. 1 during the reference excitation positive half cycles.
Figure 4:
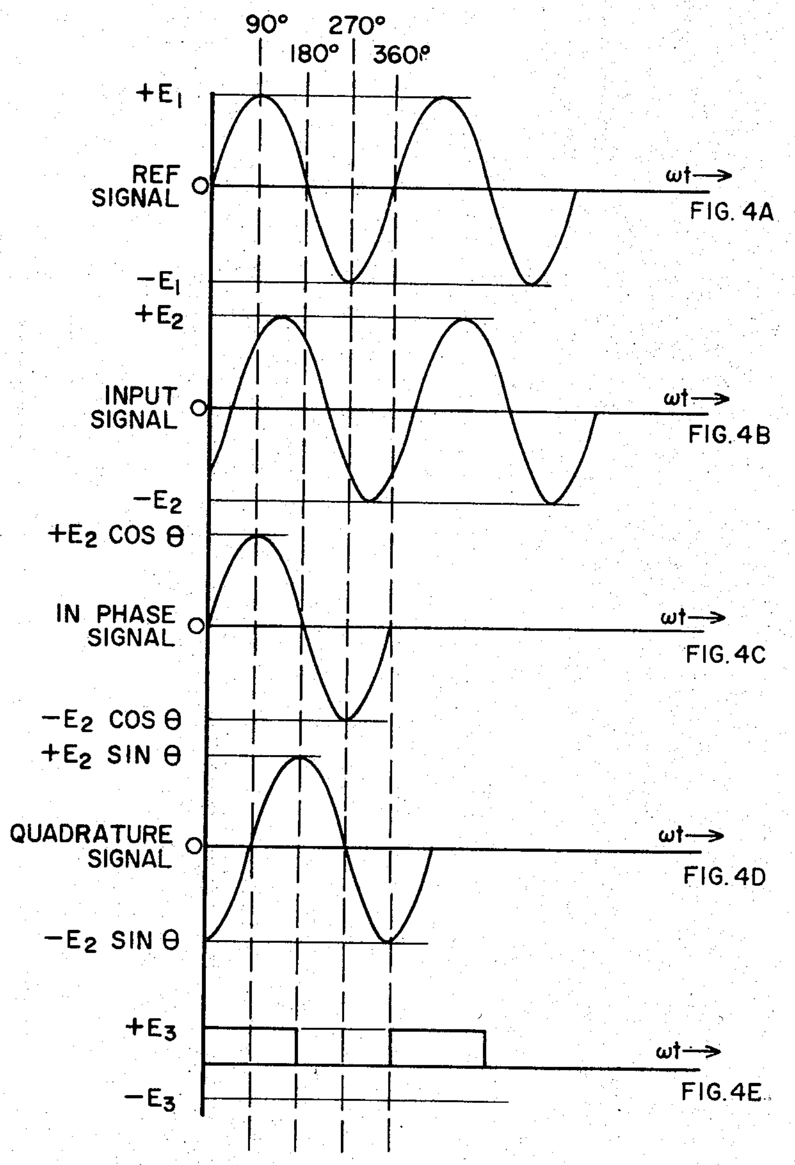
FIGS. 4A–4E are waveform diagrams to aid in explaining the operation of the quadrature rejection network of FIG. 1.

Referring now to FIG. 2, one of a pair of effective circuits of the network 10 of FIG. 1 is shown by FIG. 3 wherein corresponding components of FIG. 1 are indicated by the like numerals. The circuit of FIG. 2 is the circuit of the network of FIG. 1 rendered effective during the negative half cycle of the reference signal applied between lines 70 and 72 and the waveform of which is shown in FIG. 4A. A typical input signal of the same frequency as the reference signal but out of phase therewith by the angle $\theta$ is shown in FIG. 4B.

During the negative half cycle of the reference signal, that is, between 180° and 360°, the transistor 50 is switched on and is conducting thereby shorting the line 36 to the grounded line 22 and transistor 40 is switched off and noconducting. Thus, during this negative half cycle of the reference signal the negative portion of the inphase signal component, the waveform of which is shown in FIG. 4C of the input signal, is effectively applied across the lines 20 and 22 to render effective the circuit of FIG. 2 which may be recognized as a conventional integrator network, with the filter capacitor 24 being a practical expedient to minimize source distortion and the integrating RC combination comprising resistor 26 and capacitor 32. The inphase component of the input signal during the negative half cycle of the reference signal is negative on line 20 with respect to the ground conductor 22 and charges the plate 34 of capacitor 32 to the positive polarity, as shown thereon in FIG. 2.

It is of course elementary that the quadrature component of the input signal, the waveform of which is shown in FIG. 4D will result in no net charge being placed on capacitor 32 since this signal component drains as much charge during the interval of the negative half cycle of reference signal as it places on capacitor 32;

$$\text{viz } E_2 \sin\theta \int_{180°}^{360°} \cos\omega t dt = E_2 \sin\theta \Big[ \sin \omega t \Big]_{180°}^{360°} = 0,$$

where $E_2$ is the amplitude of the input signal, $\theta$ is the phase angle and $E_2 \sin\theta$ is the amplitude of the quadrature component of the input signal.

Referring to FIG. 3, the other effective circuit of the network of FIG. 1 is shown wherein corresponding elements of FIG. 1 are indicated by the same numerals. The circuit of FIG. 3 is the effective circuit of the network of FIG. 1 during the positive half cycle of the reference signal applied between lines 70 and 72. During the positive half cycle of the reference signal, transistor 40 is switched on and is conductive thereby shorting the line 28 to the grounded conductor 22 and transistor 50 is off and nonconducting. The plate 34 of the capacitor 32 which was positively charged during the preceding or negative half cycle of the reference signal is now discharged causing current flow in the direction as shown by the arrow in FIG. 3. The capacitor 32 is discharged through the coupling capacitor 80 and the servo error monitor 6 and input impedance 86 thereof to the grounded conductor 88. Thus, during this positive half cycle of the reference signal, the input signal is conductive through resistor 26 to ground since transistor 40 effectively shorts line 28 to the grounded input-output conductor 22. The output signal during the discharge of the capacitor 32 may be measured by monitor 6 and inasmuch as the output signal effects a waveform of pulses, as shown in FIG. 4E, the magnitude of which pulses are proportional to the magnitude of the inphase signal component of the input signal applied between lines 20 and 22 to cause winding 86 to effect a fault indication.

It should appear to those skilled in the art that the quadrature rejection is effected regardless of the angle $\theta$ by which the input signal is out of phase with the reference signal. For example if $\theta=90°$ the peak magnitude of the inphase signal $E_2 \cos\theta$, which in a vector diagram is the projection of the input signal vector on the horizontal reference vertor axis is zero since the cosine of 90° is zero. In this respect with $\theta=90°$ the peak value of the quadrature signal is the peak value $E_2$ of the input signal since $E_2 \sin\theta$ when $\theta=90°$ is equal to $E_2$. Similarly, when $\theta$ is equal to 270° the quadrature signal is the quantity minus one times input signal and the inphase signal is zero.

Further, when $\theta$ is equal to 180° the quadrature signal is zero and the peak value of the inphase signal is substantially equal to the quantity: minus one times peak value of the input signal. In this situation during the negative half cycle of the reference signal the plate 34 of capacitor 32 is negatively charged and the plate 30 is positively charged; that is, the capacitor 32 is charged to the opposite polarity from the polarity shown by FIG. 2. Also in this situation during the positive half cycle of the reference signal, capacitor 32, being charged to the polarity opposite the polarity shown in FIG. 3, is now discharged through monitor 6, which discharge causes current flow in a direction opposite the direction from that shown by the arrow in FIG. 3, but causing monitor 6 to provide a fault indication upon the voltage in either case exceeding the predetermined critical value.

In particular when $\theta$ is 180° the input signal applied between lines 20 and 22 causes a positive signal level on line 20 with respect to the grounded line 22 during the negative half cycle of the reference signal at which time transistor 50 is switched on and conducting and transistor 40 is switched off and nonconducting. Again, upon the positive half cycle of the reference signal, transistor 50 is switched off and nonconducting and transistor 40 is switched on and conducting which action effectively grounds the line 28 and allows the capacitor 32 to discharge through coupling capacitor 80, the servo error monitor 6 and the input impedance winding 86 thereof. The output signal measured by monitor 6 is then a pulse of positive polarity as shown in the waveform of FIG. 4E and is proportional to the integral of the input signal. Upon this output signal exceeding the predetermined critical voltage the impedance winding 86 effects through suitable conventional operating means a fault indication representative of an excesive inphase component of the error input signal from the signal generating device 5 which signal, as amplified, commands motor 12.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A quadrature rejection network comprising:

a first input adapated to receive a periodically varying reference signal from a reference source and including a transformer having a primary winding for receiving the periodically varying reference signal and a center tapped secondary winding inductively coupled to the primary winding;

a second input adapted to receive a second signal from a signal generating device, the second signal having an inphase component with respect to the periodically varying reference signal and a component in quadrature with the inphase component;

a first leg of the network directly connected to the second input, to a first output of the network and to the centertap of the secondary winding of the transformer;

a second leg of the network consisting of a resistor and a capacitor connected in series between the second input and a second output of the network;

a current flow control device connected to one end of the secondary winding of the transformer and rendered conductive during one portion of the periodically varying reference signal and connected to said second leg intermediate the resistor and the capacitor and to said first leg; and another current flow control device oonnected to another end of the secondary winding of the transformer and rendered conductive during another portion of the periodically varying reference signal and connected to said second leg intermediate the capacitor and the second output of the network and to said first leg;

the capacitor being charged by the inphase component of the second signal during the interval when said other current flow control device is rendered conductive and when an integral of the quadrature component of the second signal is effectively zero; and said capacitor being discharged causing an output signal proportional to an integral of the inphase component of the second signal when said first mentioned current flow control device is rendered conductive.

2. The quadrature rejection network defined by claim 1 wherein the first mentioned current flow control device includes:

a first transistor having a collector element, an emitter element and a control base, one of said elements being connected to said second leg intermediate the resistor and the capacitor, the other of said elements being connected to said first leg, and the control base being connected to one end of the secondary winding of the transformer to render the first transistor conductive between said elements thereof during one portion of the periodically varying reference signal;

the other current flow control device includes:

a second transistor having a collector element, an emitter element and a control base, one of said elements of the second transistor being connected to said second leg intermediate the capacitor and the second output of the network, the other of said elements of the second transistor being connected to said first leg and the control base of said second transistor being connected to another end of the secondary winding of the transformer to render the second transistor conductive between said elements thereof during another portion of the periodically varying reference signal.

3. The combination defined by claim 2 wherein the second input adapted to receive a second signal includes:

another capacitor connected to said first leg and to said second leg at an end of the resistor opposite from the connection of said first mentioned current flow control device connected intermediate said resistor and the first mentioned capacitor.

4. A quadrature rejection network comprising:

means for providing a periodically varying reference signal;

a transformer having a primary winding connected to said reference signal means, and a center tapped secondary winding;

means for providing a periodically varying input signal, the input signal having an inphase component with respect to the periodically varying reference signal and a component in quadrature with the inphase component;

a first leg directly connected between the input and an output of the network and connected to the center tap of the secondary winding of the transformer;

a second leg consisting of a resistor and capacitor connected in series between the input and the output;

a transistor being rendered conductive in response to a first portion of the periodically varying reference signal acting in one sense, said transistor being operably connected to said second leg intermediate the resistor and the capacitor and to one end of the secondary winding of the transformer; and another transistor being rendered conductive in response to a second portion of the periodically varying reference signal acting in an opposite sense to simultaneously render said first mentioned transistor non-conductive;

said other transistor being operably connected to said second leg intermediate the capacitor and the output and to another end of the secondary winding of the transformer and being rendered non-conductive in response to said first portion of the periodically varying reference signal acting in said one sense;

the capacitor being charged upon said other transistor being rendered conductive while said first mentioned transistor being rendered nonconductive, said capacitor being discharged to provide an output signal proportional to the inphase component of the input signal upon said first mentioned transistor being rendered conductive and while said other transistor is rendered non-conductive; and means responsive to said output signal to provide an indication of a condition of the inphase component of the input signal.

References Cited

UNITED STATES PATENTS

| | | | |
|---|---|---|---|
| 3,025,418 | 3/1962 | Brahm | 328—166 X |
| 3,162,773 | 12/1964 | Jansons | 328 166 X |
| 3,204,125 | 8/1965 | Beckerich | 328—166 X |
| 3,348,157 | 10/1967 | Sullivan et al. | |
| 3,426,283 | 2/1969 | Thor | 328—166 |
| 3,450,899 | 6/1969 | Knight | 307—232 |

DONALD D. FORRER, Primary Examiner

S. D. MILLER, Assistant Examiner

U.S. Cl. X.R.

307—295; 328—166